Oct. 25, 1966  T. M. RUNGE  3,281,095
AIRCRAFT WING AND MEANS TO REDUCE STALLING TENDENCY OF WING
AND TO FACILITATE RECOVERY FROM STALLING
Filed June 11, 1964

INVENTOR.
THOMAS M. RUNGE
BY
*B. P. Fishleman, Jr.*
ATTORNEY

United States Patent Office 3,281,095
Patented Oct. 25, 1966

3,281,095
AIRCRAFT WING AND MEANS TO REDUCE STALLING TENDENCY OF WING AND TO FACILITATE RECOVERY FROM STALLING
Thomas M. Runge, 2501 Galewood Place, Austin, Tex. 78703
Filed June 11, 1964, Ser. No. 374,300
3 Claims. (Cl. 244—42)

This invention relates to improvements in aircraft sustaining airfoils or wings.

More particularly, the invention is concerned with certain modifications of the wing structure of fixed wing aircraft enabling the aircraft to more readily recover from stalls and to achieve substantially slower flight at a greater angle of attack before stalling. In essence, the invention increases the ability of a fixed wing aircraft to "hover" without sinking. The aircraft may fly at a greater angle of attack without stalling and hence may fly at slower speeds in level flight or at a controlled sinking rate without stalling. If the aircraft, equipped with the invention, is forced into a stall as by flight at a great angle of attack, recovery from the stall is much more quickly attained with much less remedial action. The above constitutes an outline of the broad objective of the invention.

Another object is to provide aircraft wing structure for the above purposes which is entirely practical to build, economical and reliable in operation.

Other objects and advantages of the invention will be apparent during the course of the following detailed description.

Essentially, the invention involves modification of a conventional airfoil or wing to provide therein a plurality of spaced slats or slots (openings) having a fixed negative angle of attack relative to the wing major chord, while the wing is at substantially level flight attitude. Pilot control means are provided to vary the degree of exposure of the fixed slats or slots during flight from zero exposure at cruising or high speeds down to total exposure at very slow flight.

The slots constituting the invention may be shaped as true airfoils or modified airfoils or they may, in some instances, be curved plates of substantially uniform cross sectional thickness. In other instances, the slats may be substantially flat plates of uniform thin cross section. In all such instances, the slots have a fixed or built in negative angle of attack, as will be described in detail.

Figure 1:
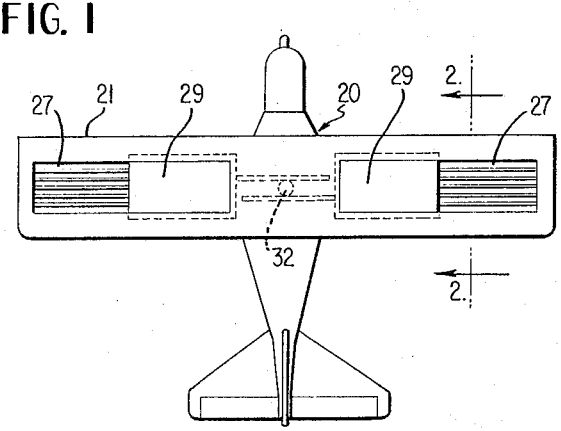
Figure 2:
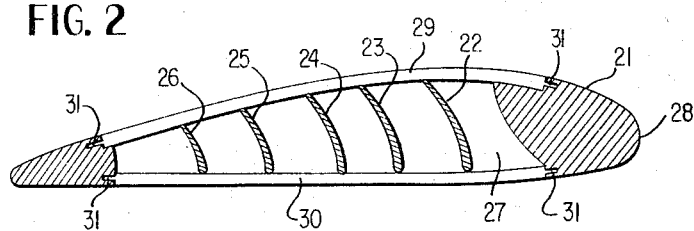
Figure 3:
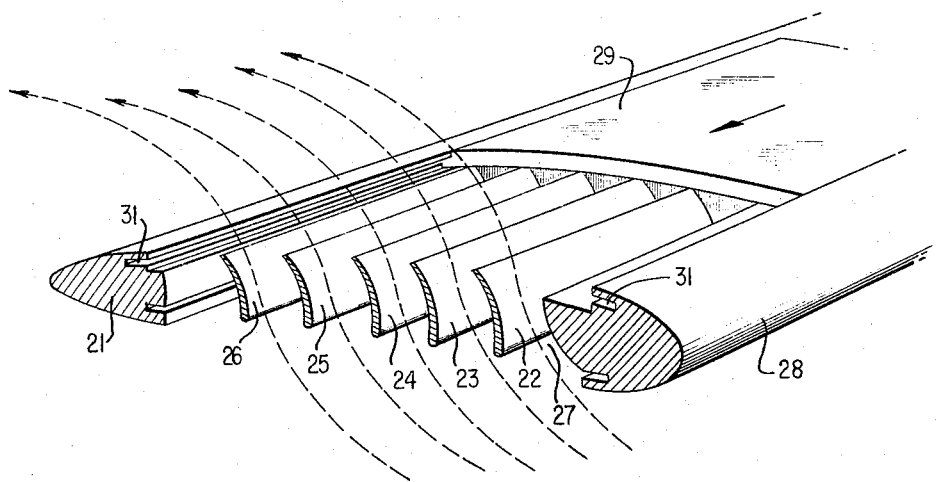

In the accompanying drawings forming a part of this application and in which like numerals are employed to designate like parts throughout the same, FIGURE 1 is a partly diagrammatic plan view of a fixed wing aircraft including a wing or airfoil equipped with the invention in accordance with the preferred embodiment thereof, FIGURE 2 is an enlarged transverse vertical section taken on line 2—2 of FIGURE 1, and FIGURE 3 is an enlarged fragmentary perspective view partly in cross section through the wing and the invention, as shown in FIGURES 1 and 2.

In the drawings, wherein for the purpose of illustration is shown a preferred embodiment of the invention, the numeral 20 designates a fixed wing aircraft having a sustaining airfoil or wing 21 which may be generally conventional as to shape and size and construction and function on the aircraft.

The invention proper comprises on each side of the aircraft fuselage and in each end portion of the wing 21 a plurality of fixed substantially rigid slats 22, 23, 24, 25 and 26, FIGURE 2, disposed bodily within a large rectangular opening 27 or compartment formed through and within the wing. The several slats 22, 23, 24, etc. are preferably uniformly spaced apart lateraly within the compartment 27 and relative to the leading and trailing edges of the wing 21. The several slats are parallel to each other and also parallel to the leading edge 28 of the wing. As shown in the drawings, the slats 22, 23, etc., may each have airfoil characteristics or shape, or the slats may be a compromise between a true airfoil and a mere curved plate of uniform cross section. In some instances, the slats may even be flat transversely and lengthwise. In any event, the slots 22, 23, 24, etc., are disposed within the compartment 27 at a fixed and rather steep negative angle of attack relative to the major chord of the wing 21. When the wing is substantially level as shown in FIGURE 2, the several slats are inclined rather steeply below the horizontal.

The several slats 22, 23, etc. are of equal length along the span of the wing 21 and are suitably rigidly anchored at their opposite ends to the end walls of the opening or chamber 27. Constructional details may be entirely conventional and as such do not form any part of this invention.

As best shown in FIGURE 2, the lower edges of the several slats 22, 23, etc., terminate somewhat above the lower or inferior surface of the wing 21 and the upper edges of the slats likewise terminate below the upper or superior surface of the wing.

For varying the degree of exposure of the slats during flight, there is provided preferably on the top and bottom of the wing longitudinally slidable closure panels 29 and 30 which are shaped to conform to the airfoil contours of the wing, as shown in FIGURE 2, and which have longitudinal tongue and grooved sliding connection with the wing structure, as indicated generally at 31 in the drawings. Any other preferred form of sliding connection between the panels 29 and 30 and the wing structure may be employed, if preferred. The outer faces of the panels 29 and 30 are preferably flush with the adjacent faces of the wing and the inner faces of the panels lie close to the longitudinal edges of the several slats, FIGURE 2.

The pairs of closure panels 29 and 30 on opposite sides of the fuselage are shiftable longitudinally of the wing 21 by some suitable pilot controlled mechanism 32 or gearing which may be hydraulically, electrically or mechanically powered. Such control and operating means are well known in the art and conventional and need not be dealt with in any detail herein. Suffice it to say that the panels 29 and 30 on opposite sides of the fuselage may be shifted outwardly and inwardly in unison under direct control of the pilot to variably cover and uncover the openings or compartments 27 and the slats 22, 23, etc., contained therein.

FIGURE 1 shows the closure panels fully retracted and the compartments 27 and slats fully uncovered or exposed, as during slow flight. During normal flight, or relatively high speed flight, the closure panels are shifted outwardly toward the tips of the wing 21 to completely cover the slats and the compartments 27. Depending upon flight conditions and the particular attitude or control desired by the pilot, the closure panels may be arranged in various intermediate positions, not shown, to expose the slats 22, 23, etc., to any necessary degree, and in this respect the invention is capable of substantially infinite adjustment to meet the widest possible range of conditions.

It will be understood in connection with FIGURE 1 that the compartments or openings 27 and the several slats therein terminate adjacent the outer ends of the panels 29 and 30 when the latter are fully retracted. In other words, the wing 21 is closed and is not apertured beneath the closure panels in the retracted positions thereof.

As previously stated, the provision of the invention slats and adjustable closure panels on the wing permits the aircraft to fly at a greater angle of attack without stalling and hence to fly at a slower speed in level flight or at a controlled sinking rate without stalling. Also, quick recovery from a stall is much more readily attainable. The exact theoretical reason or reasons in terms of aerodynamic principles which produce the invention results and mode of operation is not entirely known or understood. Nevertheless, the improved results obtained by the invention are thought to be due in part to the fact that when the wing 21 proper is in a stall condition, for example at a steep angle of attack, and unable to provide substantial lift, the multiple slats 22, 23, 24, etc., are not yet in a stall condition and do still provide substantial lift in the manner of an airfoil or modified airfoil. Thus it appears that the airplane wing equipped with slats having a negative angle of attack has its lift capability increased in comparison to a conventional wing. The wing proper under such conditions may still function as a flat plate and provide lift due to "sledding" action on the air. Other factors not entirely understood are believed also to be responsible for the good results obtained by the invention. The wing slats (or slots) may function to some extent as curved plates, with the air forces acting upon them generated by the kinetic energy of the relatively moving air over their surfaces. In some way, the air stream passing through or between the slats may tend to delay stalling by preventing or delaying turbulence above the major wing lift surface. There is apparently some modification of the usual and normal wing lift phenomenon based upon Bernoulli's principle, resulting in an increased lift capability. In any event, the objects of the invention are obtained with a good degree of efficiency by means of the construction shown in FIGURES 1-3. It should be mentioned in connection with FIGURES 1-3 that the number of slats 22, 23, 24, etc., may be varied within the scope of the invention and the arrangement shown in the drawings is typical and illustrative but should not be construed in a limiting sense. It is thought that the construction and operation of the invention in connection with FIGURES 1-3 will be readily apparent to those skilled in the art without any further description thereof.

It is understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. In an airplane wing, a main airfoil body portion having predetermined lift characteristics and being subject to stalling under certain flight conditions, said main airfoil body portion having relatively large through passages for air near opposite end portions thereof, said through passages extending for substantial distances along the span of the wing, a plurality of laterally spaced substantially parallel slats positioned within said through passages, said slats disposed bodily between the upper and lower surfaces of said main airfoil body portion with their upper and lower edges terminating somewhat inwardly of said surfaces, said slats fixed to said body portion at a negative angle of attack when said wing is in a generally level flight attitude, said slats having an approximately airfoil cross sectional shape with their leading airfoil edges disposed downwardly, and a pair of sliding closure panels for the top and bottom of each said through passage having interlocking sliding engagement with the main airfoil body portion and shiftable longitudinally of said body portion between positions where said slats are substantially fully covered and fully exposed, said closure panels having exterior surfaces which are substantially flush with the top and bottom surfaces of said wing, said closure panels being shaped in cross section to conform substantially to the airfoil configuration of the wing, and means to shift the pairs of closure panels in unison relative to said slats.

2. The invention as defined by claim 1, and wherein the opposed longitudinal sides of said through passages are recessed and grooved to slidably receive marginal portions of the closure panels, and marginal longitudinal tongues on opposed edges of the closure panels interfitting with said grooves so that the panels are positively interlocked with said main body portion.

3. In an airplane wing, a main airfoil body portion having known lift characteristics and subject to stalling under certain flight conditions, said main airfoil body portion having a passage for air formed entirely therethrough and extending over a substantial portion of the effective area of said wing, a plurality of laterally spaced substantially parallel stall-inhibiting slats fixedly secured to the body portion within the confines of said passage and each arranged at a negative angle of attack when said wing is in a generally level flight attitude, said body portion having recessed guide means along opposite longitudinal sides of said passage and adjacent the top and bottom surfaces of said wing, a pair of closure panels for said passage adjacent the top and bottom thereof of a size and shape to completely cover the top and bottom of said passage and the slats disposed therein, opposed longitudinal edge portions of said closure panels having interlocking sliding engagement with said recessed guide means, the exterior surfaces of the closure panels being substantially flush with the top and bottom surfaces of the wing and said panels being contoured transversely to conform substantially to the configuration of said wing, and means to shift said panels in unison longitudinally of the wing between active and inactive positions.

References Cited by the Examiner

UNITED STATES PATENTS

| 1,342,145 | 6/1920 | Akin | 244—12 |
| 1,918,536 | 7/1933 | Griswold | 244—42 |
| 2,077,072 | 4/1937 | Rose | 244—42 |
| 2,111,274 | 3/1938 | Bellance | 244—42 |
| 2,929,582 | 3/1960 | Munro | 244—43 X |

FOREIGN PATENTS

| 537,715 | 4/1922 | France. |
| 1,010,419 | 6/1952 | France. |

MILTON BUCHLER, *Primary Examiner.*

B. BELKIN, *Assistant Examiner.*